United States Patent
Wu (10) Patent No.: US 9,638,964 B2
(45) Date of Patent: May 2, 2017

(54) LIQUID CRYSTAL LENS AND THREE-DIMENSIONAL DISPLAY DEVICE

(71) Applicant: BOE TECHNOLOGY GROUP CO., LTD., Beijing (CN)

(72) Inventor: Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 14/429,514

(22) PCT Filed: May 6, 2014

(86) PCT No.: PCT/CN2014/076869
§ 371 (c)(1),
(2) Date: Mar. 19, 2015

(87) PCT Pub. No.: WO2015/106507
PCT Pub. Date: Jul. 23, 2015

(65) Prior Publication Data
US 2016/0004128 A1    Jan. 7, 2016

(30) Foreign Application Priority Data
Jan. 17, 2014 (CN) .......................... 2014 1 0022634

(51) Int. Cl.
*G02F 1/1343* (2006.01)
*G02B 27/22* (2006.01)
*G02F 1/29* (2006.01)

(52) U.S. Cl.
CPC ....... *G02F 1/134309* (2013.01); *G02B 27/22* (2013.01); *G02B 27/2214* (2013.01);
(Continued)

(58) Field of Classification Search
CPC ................ G02F 1/29; G02F 1/134309; G02F 2001/294; G02F 2003/28;
(Continued)

(56) References Cited

U.S. PATENT DOCUMENTS 6,671,019 B1 * 12/2003 Petschek ........... G02F 1/134336
349/129
8,953,108 B2 * 2/2015 Chen .................. G02B 27/2214
349/110
(Continued)

FOREIGN PATENT DOCUMENTS

CN    102253563 A  * 11/2011 ............. G02B 27/22
CN    102866528 A     1/2013
(Continued)

OTHER PUBLICATIONS

International Search Report mailed Oct. 21, 2014; PCT/CN2014/076869.
(Continued)

*Primary Examiner* — Ryan Crockett
(74) *Attorney, Agent, or Firm* — Ladas & Parry LLP (57) ABSTRACT

A liquid crystal (LCD) lens and a three-dimensional (3D) display device, which can achieve the equality of signal delay and reduce or eliminate the Moire phenomenon. The LC lens includes: a first substrate and a second substrate arranged opposite to each other, a liquid crystal layer disposed between the first substrate and the second substrate, and a plurality of parallel strip electrodes disposed on one side, close to the liquid crystal layer, of at least one of the first substrate and the second substrate. At least one strip electrode includes a plurality of strip sub-electrodes in sequential end-to-end connection. A specific included angle
(Continued)

($\alpha$) is formed between the extension direction of each strip sub-electrode and the extension direction of the strip electrode.

18 Claims, 11 Drawing Sheets

(52) U.S. Cl.
CPC .... *G02F 1/29* (2013.01); *G02F 2001/134345* (2013.01); *G02F 2001/294* (2013.01)

(58) Field of Classification Search
CPC ... G02F 2001/134345; G02F 2201/122; G02B 27/2214; G02B 27/26; G02B 3/14; H04N 13/0404; H04N 13/0434; H04N 13/0409
USPC .................................................... 349/200, 15
See application file for complete search history.

(56) References Cited

U.S. PATENT DOCUMENTS

| | | | | |
|---|---|---|---|---|
| 9,104,032 | B1* | 8/2015 | Chen | G02B 27/2214 |
| 2010/0157226 | A1* | 6/2010 | Sakurai | G02F 1/134363 |
| | | | | 349/139 |
| 2011/0176074 | A1* | 7/2011 | Ge | G02F 1/1396 |
| | | | | 349/15 |
| 2012/0013606 | A1* | 1/2012 | Tsai | G02B 27/2214 |
| | | | | 345/419 |
| 2012/0229442 | A1* | 9/2012 | Inoue | G02B 27/2214 |
| | | | | 345/212 |
| 2012/0320292 | A1* | 12/2012 | Guo | G02F 1/1396 |
| | | | | 349/15 |
| 2013/0208196 | A1* | 8/2013 | Kim | G02F 1/134309 |
| | | | | 349/15 |
| 2013/0314627 | A1* | 11/2013 | Liu | G02B 27/2242 |
| | | | | 349/15 |
| 2014/0160412 | A1* | 6/2014 | Peng | G02F 1/134363 |
| | | | | 349/123 |
| 2015/0002765 | A1* | 1/2015 | Liu | G02B 3/12 |
| | | | | 349/15 |
| 2015/0177570 | A1* | 6/2015 | Wu | G02F 1/134309 |
| | | | | 174/126.1 |
| 2015/0277194 | A1* | 10/2015 | Saitoh | G02F 1/133753 |
| | | | | 349/144 |
| 2016/0011458 | A1* | 1/2016 | Xu | G02F 1/1337 |
| | | | | 349/96 |

FOREIGN PATENT DOCUMENTS

| | | |
|---|---|---|
| CN | 102902127 A | 1/2013 |
| CN | 103278958 A | 9/2013 |
| CN | 103777416 A | 5/2014 |
| CN | 203673193 U | 6/2014 |

OTHER PUBLICATIONS

Written Opinion of the International Searching Authority mailed Oct. 21, 2014: PCT/CN2014/076869.
Second Chinese Office Action Appln. No. 201410022634.7; Dated Mar. 25, 2016.
First Chinese Office Action dated Oct. 29, 2015; Appln. No. 201410022634.7.
Third Chinese Office Action dated Jul. 28, 2016; Appln. No. 201410022634.7.

* cited by examiner

Column Direction

Column Direction

LIQUID CRYSTAL LENS AND THREE-DIMENSIONAL DISPLAY DEVICE

TECHNICAL FIELD

Embodiments of the present invention relate to a liquid crystal (LC) lens and a three-dimensional (3D) display device.

BACKGROUND

A display device for achieving glasses-free 3D display comprises a liquid crystal display (LCD) panel and a shield such as a parallax barrier or an LC lens disposed in front of the display panel. In the display process, a plurality of fields of view are formed through the parallax barrier or the LC lens in front of the display panel, so that light emitted by different sub-pixel units on the display panel falls into different fields of view. Two eyes of a viewer are respectively located in different fields of view, receive different images, and produce 3D sense in the brain of the viewer.

The principle of the LC lens is to focus or diverge light beams by utilization of the birefringent characteristics of liquid crystal molecules and the characteristic of liquid crystal molecules of being arranged along with the variation of electric field distribution, and with control the arrangement direction of the liquid crystal molecules by voltage change, and an effective optical zoom effect can be achieved in a small space.

The LC lens includes a plurality of lens units that are parallel and adjacent to each other. Each lens unit has the function of diverging or focusing light from a left field of view and a right field of view of the display panel. Each lens unit corresponds to two adjacent columns of sub-pixel units on the display panel, one column of sub-pixel units are configured to display an image corresponding to the left field of view, and the other column of sub-pixel units are configured to display an image corresponding to the right field of view. In general, the LC lens comprises: a first substrate and a second substrate arranged opposite to each other, a liquid crystal layer disposed between the first substrate and the second substrate, and first electrodes and second electrodes disposed on the sides, close to the liquid crystal layer, of the first substrate and the second substrate respectively.

SUMMARY

At least one embodiment of the present invention provides an LC lens and a 3D display device, which are used for eliminating the poor Moire phenomenon of the LC lens in the case of displaying a 3D image.

At least one embodiment of the present invention provides an LC lens, which comprises: a first substrate and a second substrate arranged opposite to each other, a liquid crystal layer disposed between the first substrate and the second substrate, and a plurality of parallel strip electrodes disposed on one side, close to the liquid crystal layer, of at least one of the first substrate and the second substrate. At least one strip electrode includes a plurality of strip sub-electrodes in sequential end-to-end connection. A specific included angle is formed between the extension direction of each strip sub-electrode and the extension direction of the strip electrode.

At least one embodiment of the present invention provides a 3D display device, which comprises a display panel and an LC lens disposed on a light-emitting side of the display panel. The display panel includes a pixel array. The LC lens includes: a first substrate and a second substrate arranged opposite to each other, a liquid crystal layer disposed between the first substrate and the second substrate, and a plurality of parallel strip electrodes disposed on one side, close to the liquid crystal layer, of at least one of the first substrate and the second substrate. The extension direction of the strip electrode is parallel to the row direction or the column direction of the pixel array in the display panel. At least one strip electrode includes a plurality of strip sub-electrodes in sequential end-to-end connection. A specific included angle is formed between the extension direction of each strip sub-electrode and the extension direction of the strip electrode.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
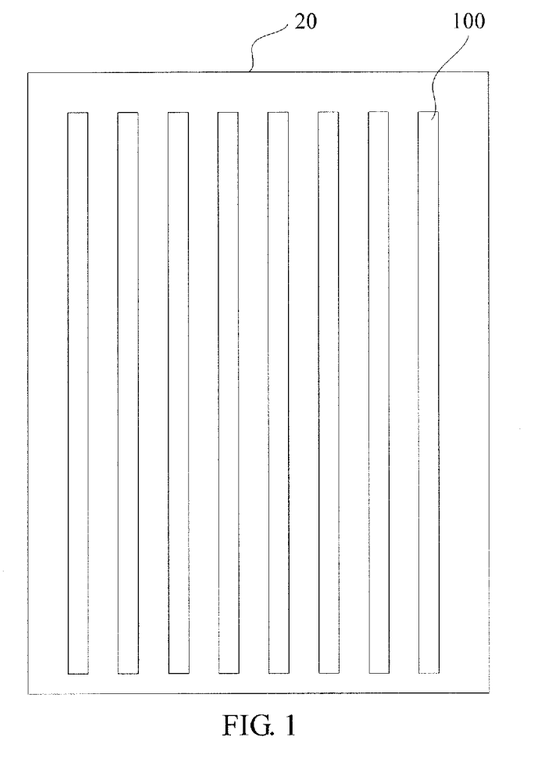
FIG. 1 is a schematic structural view 1 of strip electrodes in an LC lens.

A 3D display device comprises a display panel and an LC lens disposed in front of the display panel. The first electrodes and the second electrodes, disposed on the sides, close to the liquid crystal layer, of the first substrate and the second substrate of the LC lens respectively comprise a plurality of parallel strip electrodes 100 as shown in FIG. 1. Each strip electrode 100 is in the shape of a rectangle. The strip electrodes 100 are parallel to black matrixes (BMs) distributed in the display panel 20 along the row direction or the column direction. In the case of image display, when light emitted from a backlight of an LCD panel or an external light source runs through the strip electrodes 100, the phenomenon of slit diffraction will occur between the black matrixes and the strip electrodes 100, distributed in parallel, and hence the display panel will have Moire phenomenon. When the parallelism between the black matrixes and the strip electrodes is higher, the Moire phenomenon is more obvious.

Figure 2:
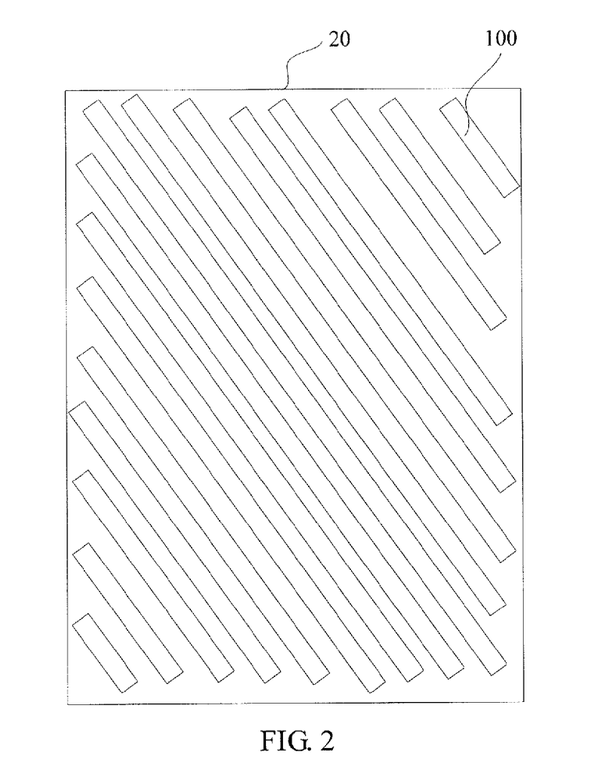
FIG. 2 is a schematic structural view 2 of the strip electrodes in the LC lens.
Figure 3:
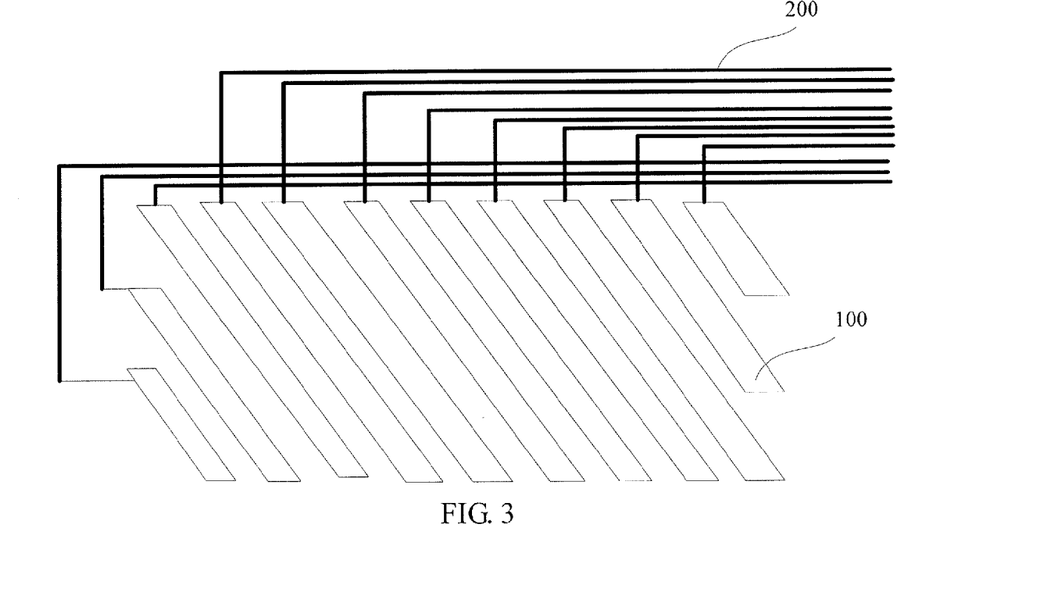
FIG. 3 is a schematic structural view of leads of the strip electrodes in the LC lens.

In order to solve the problem that the display panel suffers from Moire phenomenon in the display process, as illustrated in FIG. 2, a specific included angle may be formed between the strip electrodes 100 of the LC lens and the black matrixes distributed in the display panel 20 along the row direction or the column direction. As for a rectangular display panel, the strip electrodes 100 have unequal lengths. Thus, different strip electrodes 100 have signal delay, and hence the 3D display effect can be severely affected. In addition, as illustrated in FIG. 3, leads 200 in one-to-one correspondence with the strip electrodes 100 as shown in FIG. 2 are inevitably arranged in the crossed areas. All the leads 200 cannot be completed in one patterning process. Thus, the manufacturing process of the leads 200 of the strip electrodes 100 as shown in FIG. 2 becomes relatively complex.

At least one embodiment of the present invention provides an LC lens and a 3D display device which are configured for eliminating the poor Moire phenomenon of the LC lens in the case of displaying a 3D image.

Figure 4:
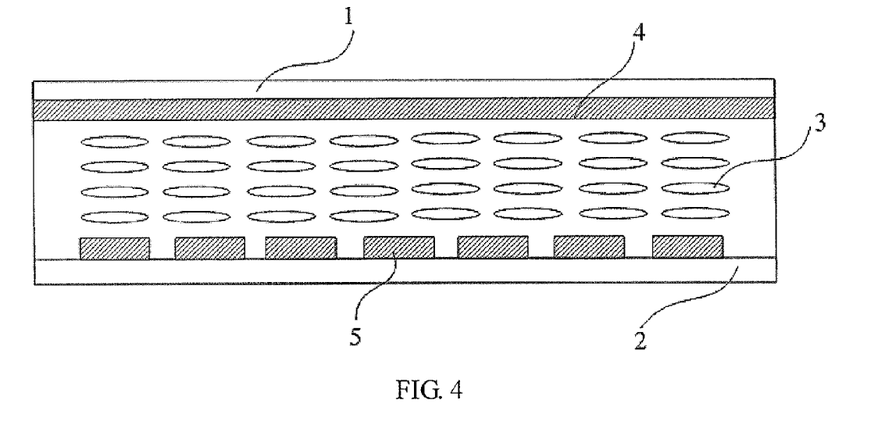
FIG. 4 is a sectional view of an LC lens provided by at least one embodiment of the present invention when no voltage is applied.

FIG. 4 is a sectional view of an LC lens provided by at least one embodiment of the present invention when no voltage is applied. The LC lens comprises: a first substrate 1 and a second substrate 2 arranged opposite to each other, a liquid crystal layer 3 disposed between the first substrate 1 and the second substrate 2, and a plurality of strip electrode 5 distributed in parallel and disposed on one side, close to the liquid crystal layer 3, of at least one of the first substrate 1 and the second substrate 2. The LC lens includes a plurality of lens units. Each LC lens unit may correspond to two strip electrodes and may also correspond to more than two strip electrodes.

One implementation of the LC lens as shown in FIG. 4 is as follows: a first electrode 4 is disposed on the first substrate 1; a second electrode 5 is disposed on the second substrate 2 and comprises a plurality of strip electrodes distributed in parallel; and the first electrode 4 is a plate electrode. For instance, the plate electrode is in the shape of a flat plate and covers the entire surface of the substrate 1 or the surface of a partial area.

It should be noted that the LC lens as shown in FIG. 4 is only intended to illustrate the strip electrodes but not intended to limit the specific structure of the LC lens. That is to say, the first electrode 4 as shown in FIG. 4 is not limited to be platy and may also be striped. The second electrode 5 is not limited to be striped and may also be of a plate integrally. For instance, one of the first electrode and the second electrode is a plate electrode, and the other is a strip electrode. When both the first electrode 4 and the second electrode 5 are striped, electrode strips on the upper side and the lower side of the liquid crystal layer may be arranged opposite to each other.

Figure 5:
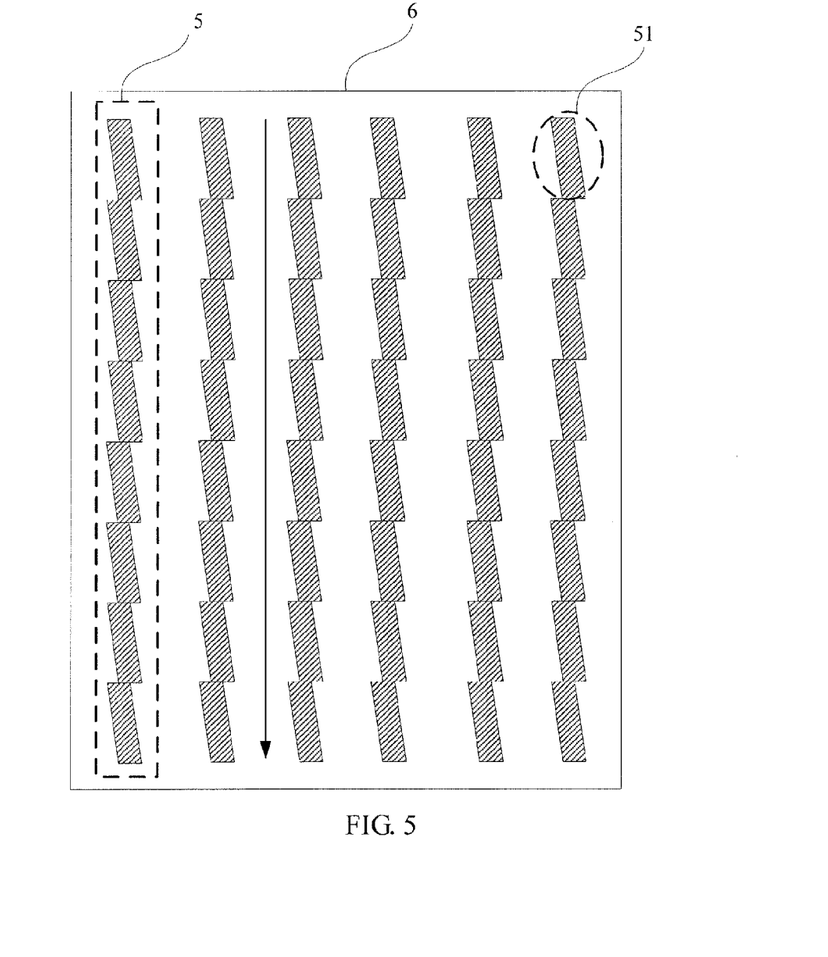
FIG. 5 is a top view of strip electrodes as shown in FIG. 4.

FIG. 5 is a top view of one example of the strip electrode 5 as shown in FIG. 4. The extension direction of the strip electrode 5 is parallel to the row direction or the column direction of the pixel array in the display panel 6. As illustrated in FIG. 5, the arrowed line refers to the extension direction of the strip electrode 5. Or when the overall shape of the LC lens is a rectangle (corresponding to the shape of the display panel), the extension direction of the strip electrode 5 may be parallel to the long side or the short side of the LC lens.

Figure 6:
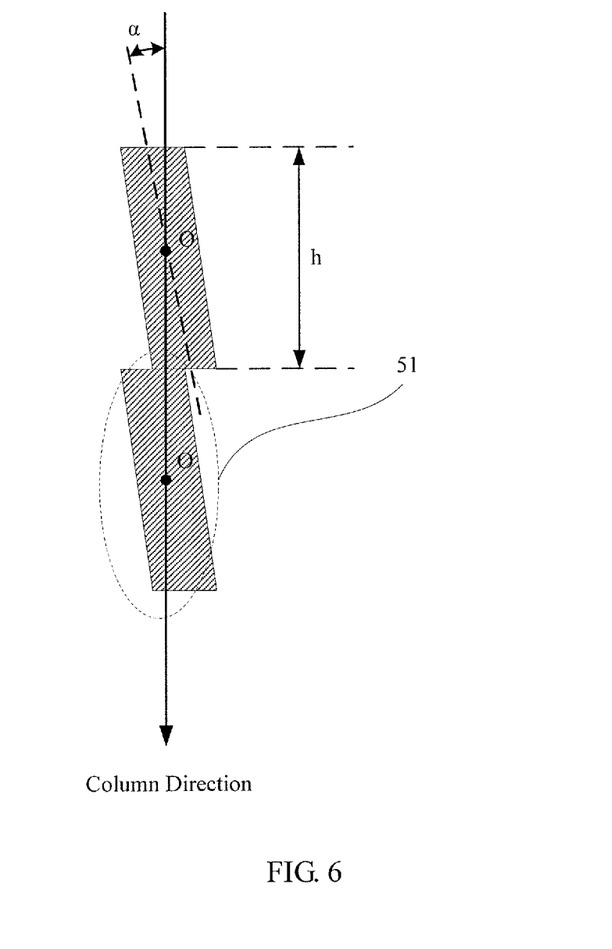
FIG. 6 is a partial enlarged view of the strip electrode as shown in FIG. 5.

FIG. 6 is a partial enlarged view of the strip electrode 5. The illustrative strip electrode 5 includes: a plurality of strip sub-electrodes 51 in sequential end-to-end connection. A specific included angle α is formed between the extension direction of each strip sub-electrode 51 and the integral extension direction of the strip electrode 5. For instance, the included angle α is an acute angle. As illustrated in FIG. 6, the arrowed line refers to the extension direction of the strip electrode 5. The extension direction is also the column direction of the pixel array of the display panel. The dotted line represents the extension direction of the strip sub-electrode. Herein, the length h (as shown in FIG. 6) of each strip sub-electrode 51 in the extension direction of the strip electrode 5 is, for instance, equal to the length of one sub-pixel of the LCD panel or the sum of the length of a plurality of (e.g., two) sub-pixels.

As seen from the cross-section of the LC lens and the electrode structure in the LC lens, the extension direction of the strip electrode 5 is parallel to the row direction or the column direction of the pixel array in the display panel. Herein, the black matrixes are distributed along the row direction and the column direction of the pixel array in the display panel. That is to say, the extension direction of the strip electrode 5 is parallel to the row direction or the column direction of the black matrixes in the display panel. The strip electrode 5 includes a plurality of connected strip sub-electrodes. A specific included angle α is formed between each strip sub-electrode 51 and the row direction or the column direction of the black matrixes. Thus, the gap between the black matrix and the strip electrode along the extension direction is not unchanged again and is irregular (uneven). Therefore, the diffraction and/or interference phenomenon between the black matrix and the strip electrode is reduced or eliminated, and hence poor Moire phenomenon of the 3D display device caused by diffraction and/or interference can be reduced or eliminated.

In addition, for instance, the extension direction of the strip electrode 5 is parallel to the row direction or the column direction of the pixel array in the display panel. Thus, the strip electrodes have equal lengths, and hence the problem of unequal signal delay caused by the unequal lengths of the strip electrodes can be resolved.

Figure 7:
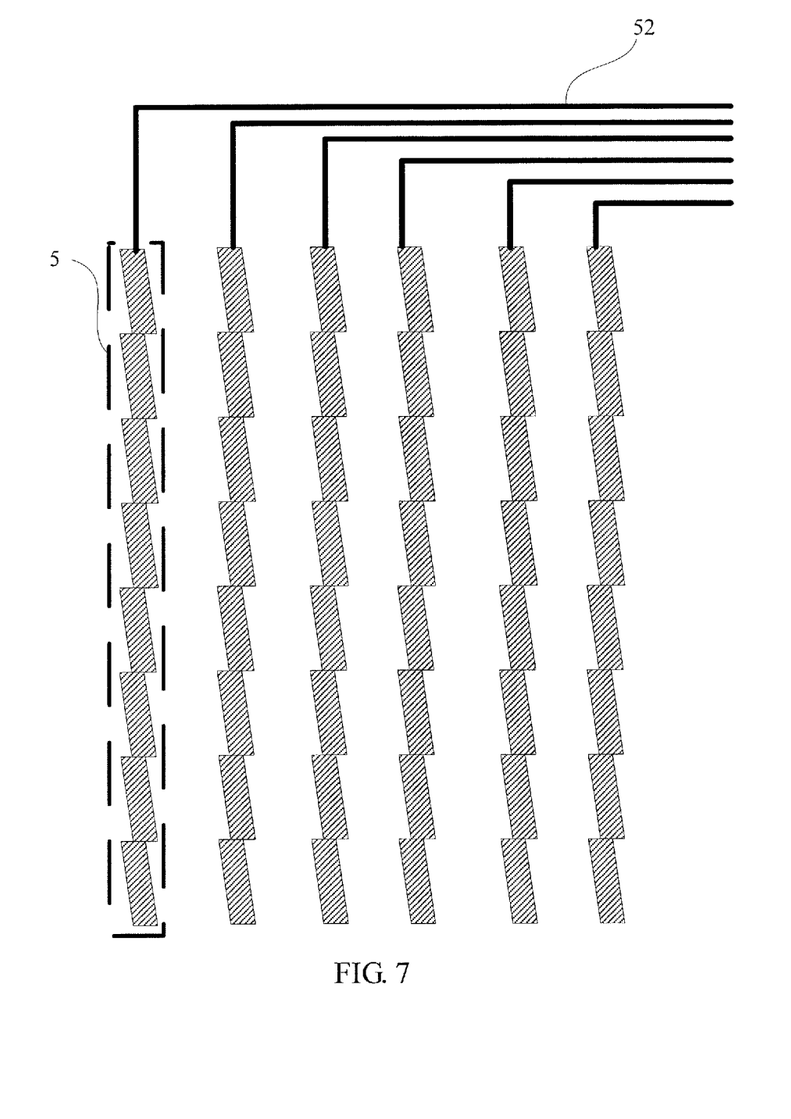
FIG. 7 is a schematic structural view illustrating the arrangement of strip electrodes provided by at least one embodiment of the present invention and leads of the strip electrodes.

Moreover, as illustrated in FIG. 7, leads 52 connected with the strip electrode 5 provided by at least one embodiment of the present invention in one-to-one correspondence are regularly arranged. The leads 52 are not required to be intersected, and the arrangement structure is simple. Moreover, the leads 52 may be formed on the same layer by one patterning process. Thus, the manufacturing process is simple.

For instance, the strip sub-electrodes in the strip electrode have equal length, namely the strip sub-electrodes in the strip electrode are regularly arranged. Thus, better 3D display effect can be achieved.

For instance, the extension directions of the strip sub-electrodes in each strip electrode are consistent or partially consistent.

For instance, the strip sub-electrodes 51 in the strip electrode 5 as shown in FIGS. 5 and 6 have consistent extension direction, namely are extended towards the same direction.

Figure 8:
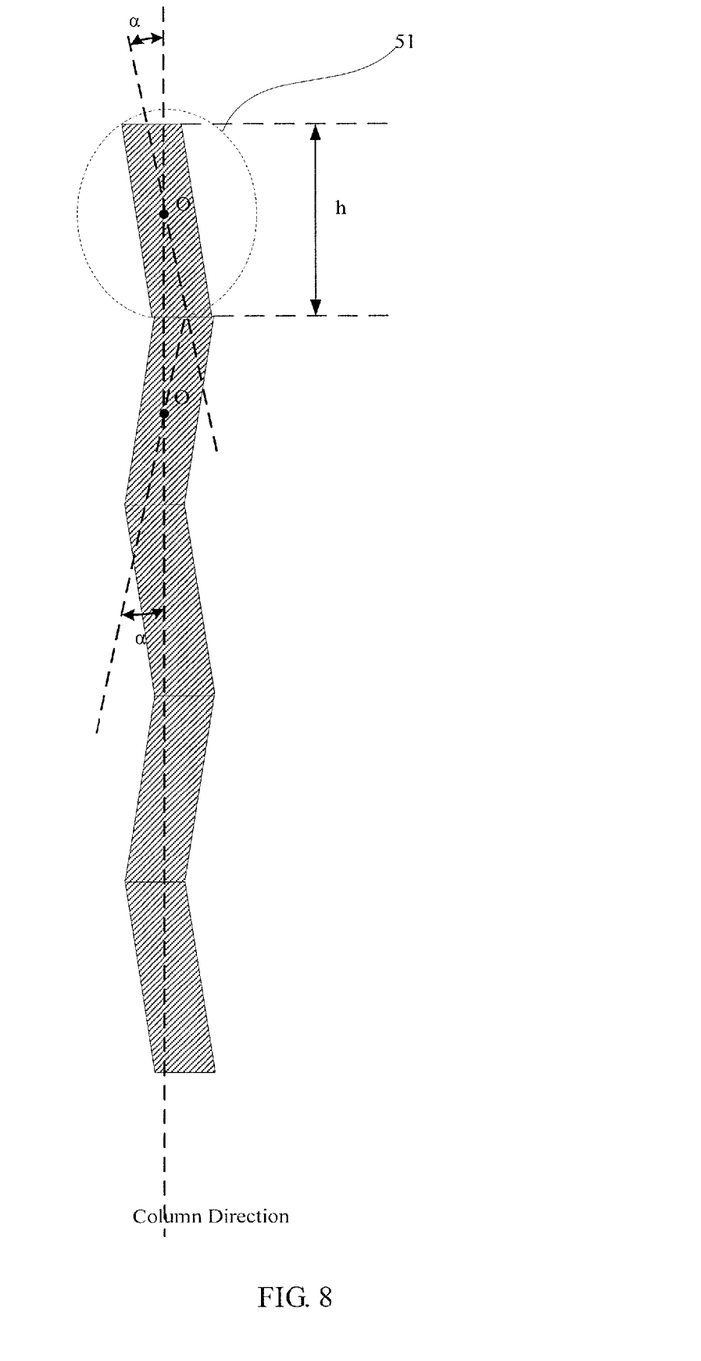
FIG. 8 is a schematic structural view illustrating the relative arrangement of strip sub-electrodes in the strip electrode provided by at least one embodiment of the present invention.

FIG. 8 illustrates one embodiment in which the extension directions of the strip sub-electrodes 51 are not absolutely consistent with each other. In the strip electrode 5 as shown in FIG. 8, the strip sub-electrodes 51 in odd number positions have consistent extension direction, and the strip sub-electrodes 51 in even number positions have consistent extension direction. Similarly, the length h (as shown in FIG. 8) of each strip sub-electrode 51 in the extension direction of the strip electrode 5 is, for instance, equal to the length of one sub-pixel of the LCD panel or the sum of the length of a plurality of (e.g., two) sub-pixels.

For instance, the specific included angle $\alpha$ may be 0° to 45°. Due to the angle $\alpha$, the extension direction of the strip sub-electrode 51 may be roughly the same as the extension direction of the entire strip electrode 5. For instance, the specific included angle $\alpha$ may be 12.53°, 18.43° or 15.53°. At this point, the poor Moire phenomenon of the 3D display device caused by diffraction and/or interference can be better reduced or eliminated.

As illustrated in FIG. 8, for instance, a line connecting centers O of the strip sub-electrodes 51 is parallel to the extension direction of the strip electrode 5, which further ensures that the strip electrodes are distributed in a straight line as a whole, namely along the row direction or the column direction of the sub-pixels on the whole.

For instance, sub-pixels are in the shape of a regular rectangle, and the row direction or the column direction of the sub-pixels is parallel to the long side or the short side of the sub-pixels. The sub-pixels provided by some embodiments of the present invention are not limited to be rectangular and may also be polygonal.

When the sub-pixels are each a regular pattern, for instance, the strip electrodes are distributed along the direction parallel to the long sides of the sub-pixels in the display panel.

For instance, the strip electrodes are distributed along the direction parallel to the short sides of the sub-pixels in the display panel.

Figure 9:
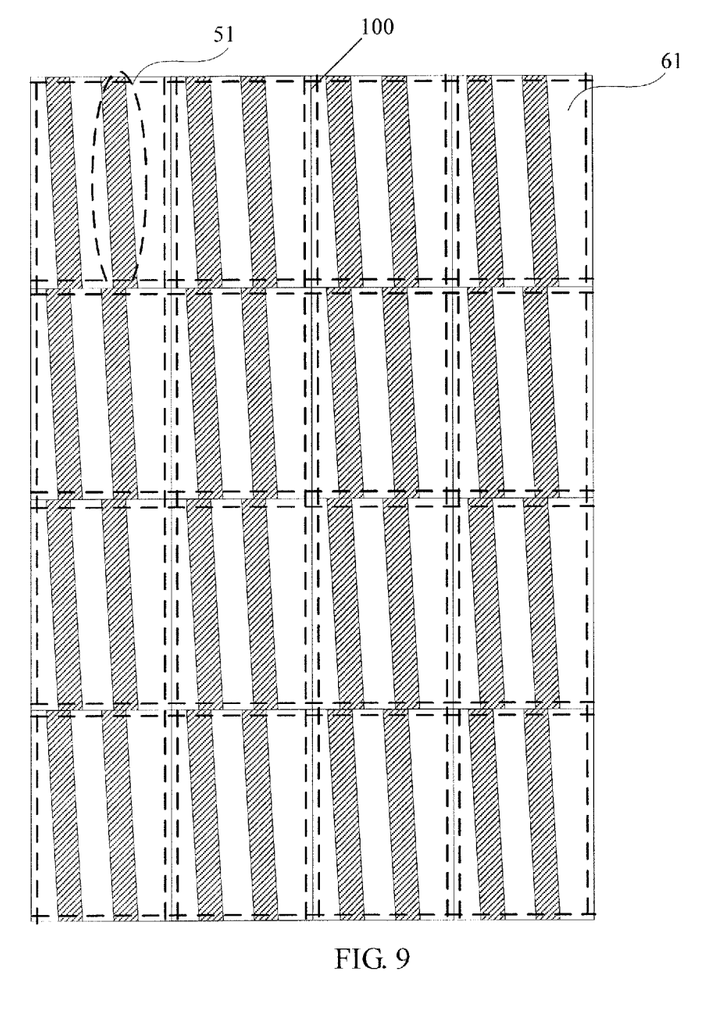
FIG. 9 is a schematic structural view of the arrangement mode 1 of the strip electrodes provided by at least one embodiment of the present invention.

As illustrated in FIG. 9, in one embodiment, the display panel 6 comprises a pixel array. The pixel array includes a plurality of sub-pixels 61 distributed in rows and columns. An area covered by each sub-pixel 61 is rectangular. The black matrixes 100 are disposed between the sub-pixels. The black matrix 100 includes light-tight (light-shielding) strips which are intersected with each other in the row and column directions. The light-tight strips define opening areas used for display.

The strip electrode 5 in the LC lens 7 are distributed along the direction parallel to the long sides of the sub-pixels 61 in the display panel; or the strip electrode 5 are distributed along the direction parallel to the short sides of the sub-pixels 61 in the display panel 6.

For instance, the strip electrode 5 as shown in FIG. 9 are distributed along the direction parallel to the long sides of the sub-pixels 61 in the display panel. In the embodiment as shown in FIG. 9, each sub-pixel 61 of the display panel corresponds to two strip electrodes of the LC lens, and the length of each strip sub-electrode 51 of the strip electrode in the extension direction is equal to the length of each sub-pixel 61.

Figure 10:
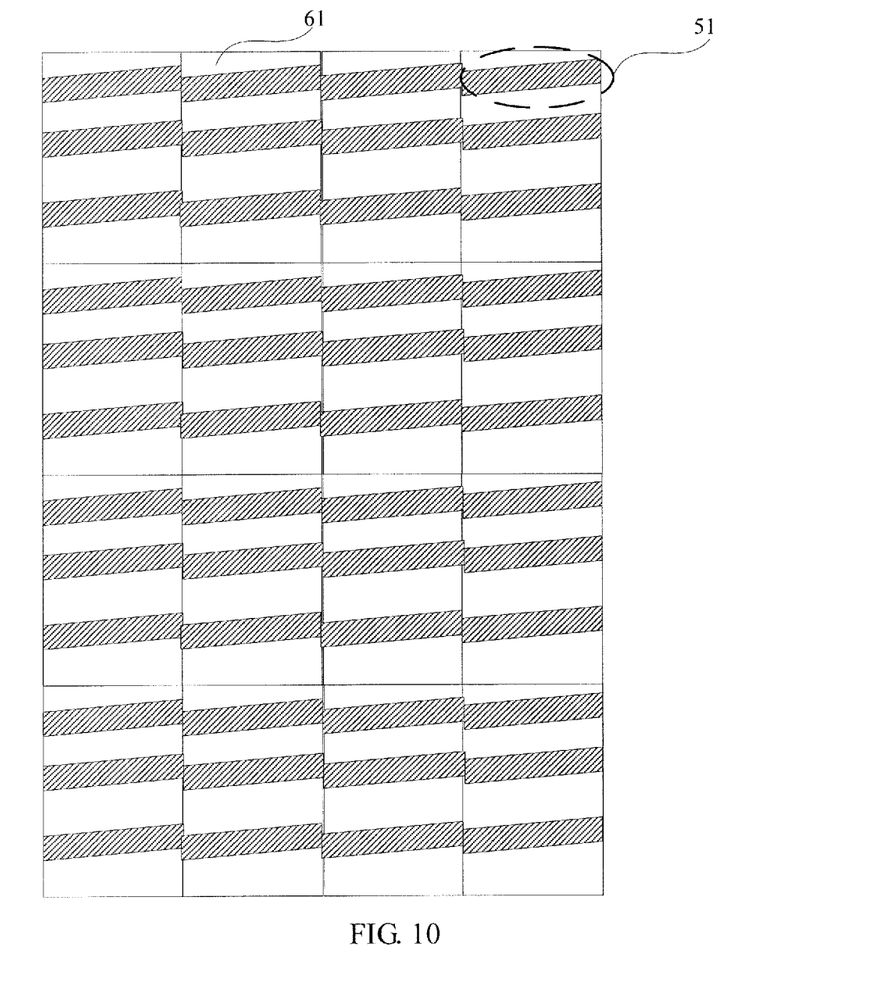
FIG. 10 is a schematic structural view of the arrangement mode 2 of the strip electrodes provided by at least one embodiment of the present invention.

For instance, the strip electrode 5 as shown in FIG. 10 are distributed along the direction parallel to the short sides of the sub-pixels 61 in the display panel. The black matrixes are not shown in FIG. 10. In the embodiment, the black matrix still includes light-tight strips which are intersected with each other in the row and column directions. The light-tight strips define opening areas used for display. In the embodiment as shown in FIG. 10, each sub-pixel 61 of the display panel corresponds to three strip electrodes, and the length of each strip sub-electrode 51 of the strip electrode in the extension direction is equal to the length of each sub-pixel 61. In the embodiment of the present invention, the corresponding relation between each sub-pixel of the display panel and the strip electrode of the LC lens is not limited to the cases as shown in FIGS. 9 and 10.

As illustrated in FIG. 9 or 10, each strip sub-electrode 51 is disposed in an area corresponding to one sub-pixel or a plurality of sub-pixels. When the LC lens and the display panel are combined into the 3D display device, the orthographic projection of each strip sub-electrode 51 covers one sub-pixel 61 or a plurality of adjacent sub-pixels 61, namely each strip sub-electrode 51 is extended from one side of one sub-pixel 61 to the other side of the sub-pixel or extended to other side of the plurality of adjacent sub-pixels.

The electrode structure as shown in FIGS. 9 and 10 is that each strip sub-electrode 51 corresponds to one sub-pixel.

Figure 11:
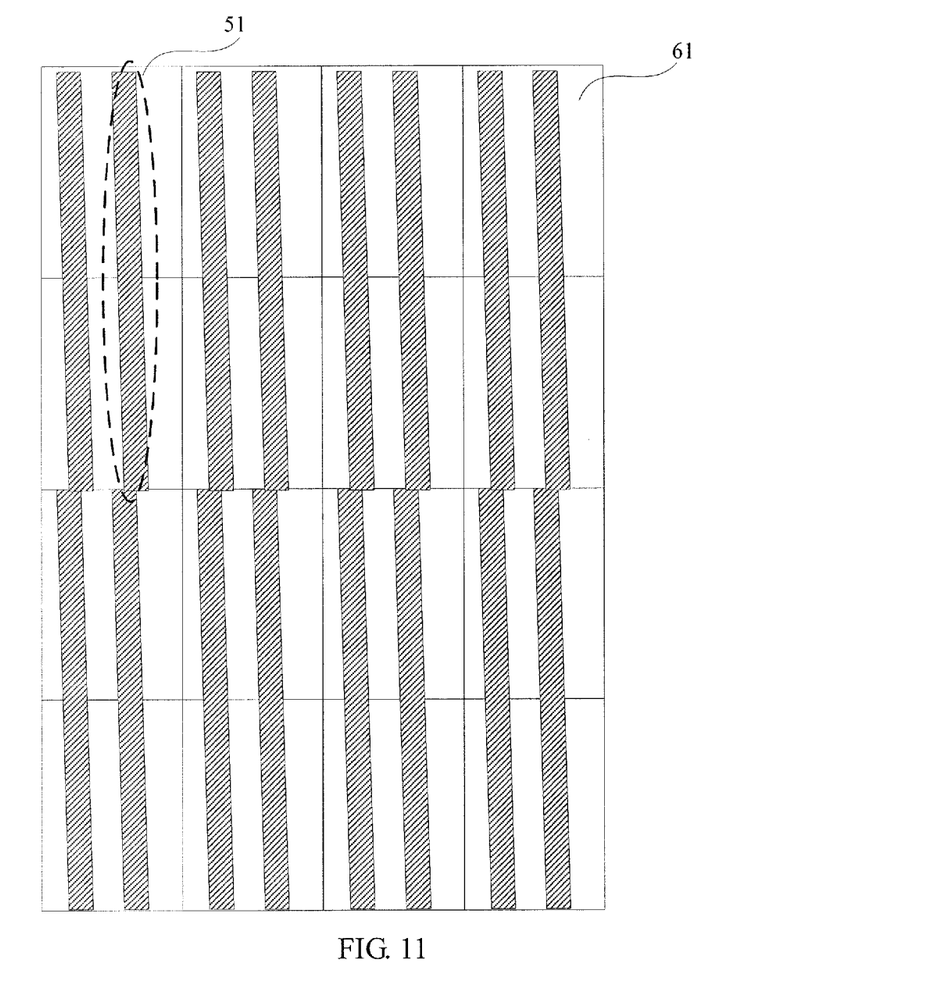
FIG. 11 is a schematic structural view of the arrangement mode 3 of the strip electrodes provided by at least one embodiment of the present invention.

The electrode structure as shown in FIG. 11 is that each strip sub-electrode 51 corresponds to two sub-pixels. FIG. 11 only illustrates one embodiment. The case that the orthogonal projection of each strip sub-electrode 51 on the display panel covers the plurality of adjacent sub-pixels 61 is not shown in the figure.

As seen from the strip electrode structure as shown in FIGS. 9 to 11, the strip electrode 5 is distributed along the direction parallel to the long sides of the sub-pixels 61 in the display panel; or the strip electrode 5 is distributed along the direction parallel to the short sides of the sub-pixels 61 in the display panel 6. As the long side and the short side of each sub-pixel 61 are respectively parallel to the pixel row and the pixel column, the black matrixes are distributed along the row direction and the column direction of the pixel array in the display panel. Thus, the extension direction of the strip electrode 5 is parallel to the row direction or the column direction of the black matrixes in the display panel; a specific included angle $\alpha$ is formed between each strip sub-electrode 51 and the row direction or the column direction of the black matrixes; and the gap between the black matrixes and the strip electrode in the extension direction is irregular. Therefore, the diffraction and/or interference phenomenon between the black matrixes and the strip electrodes is reduced or eliminated, and hence poor Moire phenomenon of the 3D display device caused by diffraction and/or interference can be reduced or eliminated.

Detailed description will be given below to the specific structure of the 3D display device provided by at least one embodiment of the present invention.

Figure 12:
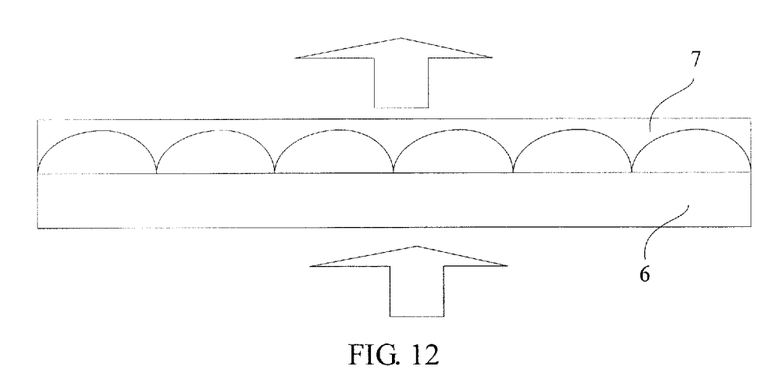
FIG. 12 is a schematic structural view of a 3D display device provided by at least one embodiment of the present invention.

FIG. 12 is a schematic structural sectional view of the 3D display device provided by at least one embodiment of the present invention. The 3D display device comprises a display panel 6 and an LC lens 7 disposed on a light-emitting side of the display panel.

The LC lens 7 is any type of LC lens provided by the above embodiment. The display panel is, for instance, an LCD panel, an organic light-emitting diode (OLED) display panel or the like. The LCD panel, for instance, may be of in-plane switching (IPS) type, fringe field switching (FFS) type, advanced super dimension switch (ADS) type, twisted nematic (TN) type or the like.

Arrows in FIG. 12 represent light rays. The display device may be: any product or component with display function such as a mobile phone, a tablet PC, a TV, a display, a notebook computer, a digital picture frame and a navigator.

As the 3D display device is provided with the LC lens provided by the embodiment of the present invention, the poor Moire phenomenon of the 3D display device caused by diffraction and interference can be reduced or eliminated. Meanwhile, the problem of unequal signal delay caused by the unequal lengths of the strip electrodes can also be avoided. Thus, the 3D image display can have higher quality.

The application claims priority to the Chinese patent application No. 201410022634.7 submitted on Jan. 17, 2014. The disclosure content of the Chinese patent application is incorporated herein by reference as part of the application.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The invention claimed is:

1. A liquid crystal (LC) lens, comprising:
a first substrate and a second substrate arranged opposite to each other;
a liquid crystal layer disposed between the first substrate and the second substrate; and
a plurality of parallel strip electrodes disposed on one side, close to the liquid crystal layer, of at least one of the first substrate and the second substrate,
wherein at least one strip electrode of the strip electrodes includes a plurality of strip sub-electrodes in sequential end-to-end connection; and a specific included angle is formed between the extension direction of each strip sub-electrode and the extension direction of the strip electrode,
wherein the strip sub-electrodes have a consistent extension direction.

2. The LC lens according to claim 1, wherein the strip sub-electrodes of the strip electrode have an equal length.

3. The LC lens according to claim 1, wherein the included angle is from 0° to 45°.

4. The LC lens according to claim 3, wherein the included angle is 18.43°, 15.53° or 12.53°.

5. The LC lens according to claim 1, wherein a line connecting centers of the strip sub-electrodes is parallel to the extension direction of the strip electrode.

6. The LC lens according to claim 1, wherein the LC lens is in the shape of a rectangle; and the strip electrodes are distributed along a direction parallel to the long side of the LC lens.

7. The LC lens according to claim 1, wherein the LC lens is in the shape of a rectangle; and the strip electrodes are distributed along a direction parallel to the short side of the LC lens.

8. The LC lens according to, claim 1, wherein a line connecting centers of the strip sub-electrodes is parallel to the extension direction of the strip electrode.

9. A three-dimensional (3D) display device, comprising a display panel and an LC lens disposed on a light-emitting side of the display panel,
wherein the display panel includes a pixel array;
the LC lens includes: a first substrate and a second substrate arranged opposite to each other, a liquid crystal layer disposed between the first substrate and the second substrate, and a plurality of parallel strip electrodes disposed on one side, close to the liquid crystal layer, of at least one of the first substrate and the second substrate;
the extension direction of the strip electrodes is parallel to the row direction or the column direction of the pixel array in the display panel;
at least one strip electrode of the strip electrodes includes a plurality of strip subs electrodes in sequential end-to-end connection; and a specific included angle is formed between the extension direction of each strip sub-electrode and the extension direction of the strip electrode,
wherein the strip sub-electrodes have a consistent extension direction.

10. The 3D display device according to claim 9, wherein the strip sub-electrodes in the strip electrode have an equal length.

11. The 3D display device according to claim 9, wherein the specific included angle is from 0° to 45°.

12. The 3D display device according to claim 11, wherein the specific included angle is 18.43°, 15.53° or 12.53°.

13. The 3D display device according to claim 9, wherein a line connecting centers of the strip sub-electrodes is parallel to the extension direction of the strip electrode.

14. The 3D display device according to claim 9, wherein the strip electrodes are distributed along a direction parallel to short sides of sub-pixels in the pixel array of the display panel.

15. The 3D display device according to claim 9, wherein the strip electrodes are distributed along a direction parallel to long sides of sub-pixels in the pixel array of the display panel.

16. The 3D display device according to claim 14, wherein each strip sub-electrode is disposed in an area corresponding to one sub-pixel or a plurality of sub-pixels.

17. The 3D display device according to claim 9, wherein a line connecting centers of the strip sub-electrodes is parallel to the extension direction of the strip electrode.

18. The 3D display device according to claim 17, wherein each strip sub-electrode is disposed in an area corresponding to one sub-pixel or a plurality of sub-pixels.

* * * * *